United States Patent [19]
Ando et al.

[11] Patent Number: 5,476,029
[45] Date of Patent: Dec. 19, 1995

[54] PNEUMATIC BOOSTER HAVING VACUUM AND PRESSURIZED AIR SOURCES

[75] Inventors: Hiromi Ando; Nobumaro Osaka; Yasuhiko Amari, all of Yamanashi, Japan

[73] Assignee: Tokico Ltd., Kanagawa-ken, Japan

[21] Appl. No.: 309,194

[22] Filed: Sep. 20, 1994

[30] Foreign Application Priority Data

Sep. 20, 1993 [JP] Japan .................................. 5-257823
Dec. 15, 1993 [JP] Japan .................................. 5-342894

[51] Int. Cl.⁶ .............................. F15B 13/04; F15B 9/10; F15B 11/08
[52] U.S. Cl. .............................. 91/32; 91/376 R; 91/448
[58] Field of Search .......................... 91/5, 6, 32, 369.1, 91/369.2, 376 R, 379, 448

[56] References Cited

U.S. PATENT DOCUMENTS

| | | | |
|---|---|---|---|
| 3,295,419 | 1/1967 | Vielmo et al. | 91/376 RX |
| 3,357,311 | 12/1967 | Cripe | 91/448 X |
| 3,780,620 | 12/1973 | Gardner | 91/6 |
| 4,116,218 | 9/1978 | Acre et al. | 91/32 X |
| 4,309,935 | 1/1982 | Belart | 91/376 |
| 5,005,465 | 4/1991 | Boehm et al. | 91/376 X |
| 5,400,693 | 3/1995 | Schluter | 91/376 |

FOREIGN PATENT DOCUMENTS

52-4969   1/1977   Japan ........................ 91/376

*Primary Examiner*—John E. Ryznic
*Attorney, Agent, or Firm*—Wenderoth, Lind & Ponack

[57] ABSTRACT

A pneumatic booster comprises a piston dividing a housing into front and rear chambers, the front chamber being is constant communication with a vacuum source, the rear chamber being selectively supplied with an atmospheric pressure source or a compressed air source, wherein a valve body of the piston includes a bore having a retainer mounted within, and an input rod movable within the retainer and having a compressed air passage extending therein, the bore of the valve body also having a first rear control valve and a second front control valve, such that movement of the input rod opens the first rear control valve to allow atmospheric air into the booster chamber and a further movement of the input rod opens the second front control valve to allow compressed air into the booster chamber, resulting in an increased output force of the booster.

6 Claims, 6 Drawing Sheets

PNEUMATIC BOOSTER HAVING VACUUM AND PRESSURIZED AIR SOURCES

BACKGROUND OF THE INVENTION

1. Field of the Invention

The present invention relates to a pneumatic booster used in a braking system of an automobile, and more particularly, it relates to a pneumatic booster of the type wherein the atmosphere and compressed air can be selectively supplied into a variable pressure chamber of the booster.

2. Related Background Art

A typical conventional pneumatic booster comprises a housing, a diaphragm for dividing the housing into a constant pressure chamber and a variable pressure chamber, and a valve body connected to the diaphragm. The valve body is provided with a bore within which a plunger is slidably mounted for movement in an axial direction. The plunger is provided with two passages so that, when the plunger is slidably shifted relative to the valve body, the variable pressure chamber can selectively be communicated with the atmosphere or a compressed air source through the respective passages via a valve mechanism.

Since the above-mentioned two passages extend in an axial directions within the plunger, respectively, a diameter of the plunger is naturally increased. Thus, in the conventional pneumatic booster, there arose a problem that the entire booster becomes bulky.

SUMMARY OF THE INVENTION

A pneumatic booster for a brake system according to the present invention comprises a housing, a movable power piston provided in the housing and dividing the interior of the housing into a constant pressure chamber and a variable pressure chamber, a valve body connected to the power piston and having a cylindrical portion extending to the outside of the housing. The cylindrical portion has a bore axially extending therein. A communication passage is formed in the side wall of the cylindrical portion so that the outer end of the communication passage is connected to a source of pressurized air. A retainer is inserted in the bore of the cylindrical portion so as to divide the interior of the bore into a front space and a rear space. The retainer has a retainer passage which communicates with the communication passage with a pressurized air passage in a plunger slidably supported by the retainer. The retainer also has an atmospheric pressure passage axially extending through the retainer and communicating the front and rear spaces. Control valve means is provided for selectively changing communication between the constant pressure chamber, variable pressure chamber, pressurized air passage and atmospheric pressure passage so that the variable pressure chamber is selectively supplied with the atmospheric pressure and pressurized air in response to the movement of the plunger.

The present invention also provides a pneumatic booster which comprises a housing, a movable power piston provided in the housing and dividing the interior of the housing into a constant pressure chamber and a variable pressure chamber, a valve body connected to the power piston and having a cylindrical portion extending to the outside of the housing, a communication passage formed in the side wall of the cylindrical portion so that the outer end of the communication passage is connected to a source of pressurized air, a retainer inserted in a bore in the cylindrical portion so as to divide the interior of the bore into a front space and a rear space and having a retainer passage which communicates with the communication passage, a plunger slidably and sealingly supported by said retainer and having a pressurized air passage communicating the retainer passage and the front space, a constant pressure chamber passage for communicating the constant pressure chamber with the front space, a variable pressure chamber passage for communicating the variable pressure chamber with the front space, an atmospheric pressure passage for connecting the front space to the atmosphere, and control valve means for selectively changing communication between the constant pressure chamber, variable pressure chamber, pressurized air passage and atmospheric pressure passage so that the variable pressure chamber is selectively supplied with the atmospheric pressure and pressurized air in response to the movement of the plunger. The booster has a stopper inserted in the communication passage in the cylindrical portion and having a stopper passage communicating the source of pressurized air with the retainer passage and a portion engageable with the retainer for preventing the retainer from being removed from the cylindrical portion.

DETAILED DESCRIPTION

Before the present invention is fully explained, a conventional pneumatic booster will be described in order to facilitate the understanding of the present invention.

Figure 8:
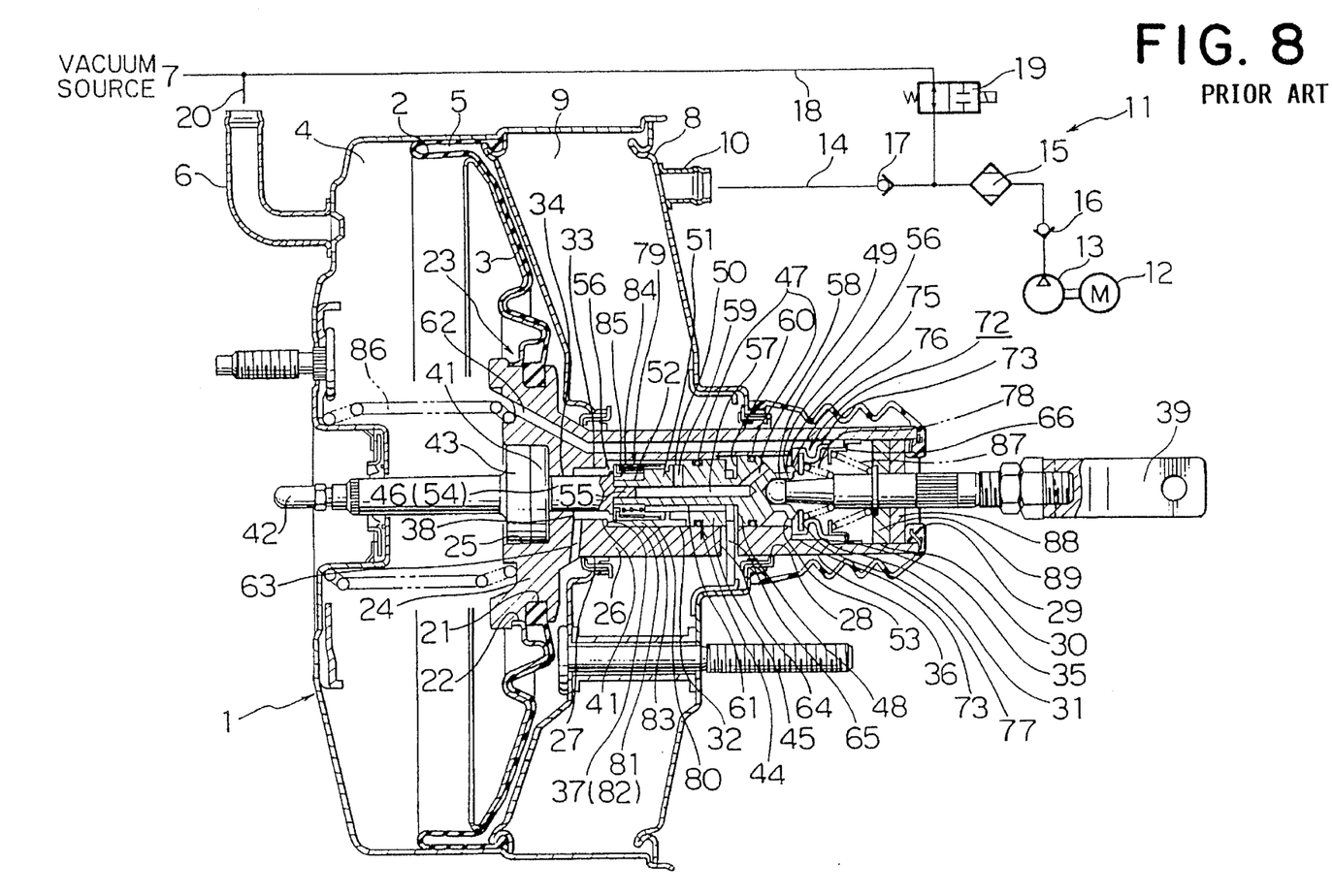
FIG. 8 is a sectional view showing an example of a conventional pneumatic booster.

FIG. 8 shows an example of a conventional pneumatic booster. In FIG. 8, interior of a housing 1 is divided into a constant pressure chamber (negative pressure chamber) 4 and a variable pressure chamber 5 by a power piston 3 having a diaphragm 2. The constant pressure chamber 4 is connected to a vacuum source 7 of an engine (not shown) through a constant pressure introduction passage 6 so that negative pressure is introduced into the constant pressure chamber. A casing 8 is connected to a rear surface of the housing 1 so that a pressure accumulating chamber 9 is defined by a rear surface of the housing 1 and the casing 8.

The pressure accumulating chamber 9 is provided with a compressed air introduction opening 10 to which a compressed air generating mechanism 11 is connected. The compressed air generating mechanism 11 comprises a compressor 13 driven by a motor 12 to produce compressed air, a drier 15 disposed in a pipe 14 connecting the compressor 13 to the compressed air introduction opening 10, and first and second compressed air check valves 16, 17 disposed in the pipe 14 between the drier 15 and the compressor 13 and between the drier 15 and the compressed air introduction opening 10, respectively. A portion of the pipe 14 between the second compressed air check valve 17 and the drier 15 is connected to the vacuum source 7 via a pipe 18, and a normally opened electromagnetic valve 19 is disposed in the pipe 18. A portion of the pipe 18 between the electromagnetic valve 19 and the vacuum source 7 is connected to the constant pressure introduction passage 6.

The compressed air is previously stored in the pressure accumulating chamber 9 by driving the compressed air generating mechanism 11. The diaphragm 2 and the power piston 3 are provided with central openings 21, 22, respectively, into which a large diameter cylindrical portion 24 of a valve body 23 (referred to as "valve body large diameter cylindrical portion" hereinafter) is sealingly inserted.

The valve body 23 comprises the above-mentioned valve body large diameter cylindrical portion 24 in which a large diameter bore 25 having a bottom is formed, and a valve body small diameter cylindrical portion 26 contiguous to the valve body large diameter cylindrical portion 24. A tip end (the other end) of the valve body small diameter cylindrical portion 26 is sealingly inserted into an opening 27 formed in the rear wall of the housing 1 and an opening 28 formed in the casing 8 to be protruded out of the casing 8, so that the atmosphere can be introduced into the valve body small diameter cylindrical portion 26 through an opening portion 29 of the latter.

First, second, third, fourth and fifth bore portions 30, 31, 32, 33, 34 are formed in the valve body small diameter cylindrical portion 26, which bore portions have inner diameters decreased step by step from the opening portion 29 toward the valve body large diameter cylindrical portion 24, and the fifth bore portion 34 is communicated with the large diameter bore 25. First, second, third and fourth stepped portions 35, 36, 37, 38 are formed between the first, second, third, fourth and fifth bore portions 30, 31, 32, 33, 34, respectively. An annular ridge 40 protruding toward an input shaft 39 is formed on an inner surface of the third stepped portion 37.

A reaction disk 41 and a large diameter base portion 43 of an output shaft 42 connected to a master cylinder (not shown) are housed in the large diameter bore 25 of the valve body 23, and a plunger 44 which is movable in response to movement of the input shaft 39 is housed in the valve body small diameter cylindrical portion 26. The plunger 44 comprises a first plunger 45 disposed within the first, second and third bore portions 30, 31, 32, and a second plunger 46 slidably mounted within the fifth bore portion 34.

The first plunger 45 comprises a first plunger body 48 slidably mounted within the third bore portion 32 via a pair of seal members 47, a first plunger shaft portion 49 contiguous to the first plunger body 48 and extending toward the opening portion 29, first, second and third plunger small diameter portions 50, 51, 52 contiguous to the first plunger body 48 and having diameters decreasing step by step toward the second plunger 46, and a first plunger flange portion 53 formed on a tip end (right end in FIG. 4) of the first plunger shaft portion 49 to be protruded radially outwardly. The first plunger shaft portion 49 is connected to the input shaft 39 which is operated in synchronous with a movement of a brake pedal (not shown).

The second plunger 46 comprises a second plunger body 54, a second plunger shaft portion 55 adjacent to the first plunger 45, and a second plunger flange portion 56 formed on the second plunger body 54 to be protruded radially outwardly. The first and second plungers 45, 46 are integrally connected to each other by press-fitting the second plunger shaft portion 55 into a central passage 57 formed in the first plunger 45.

The central passage 57 extends up to the first plunger body 48. There is provided a plunger first communication passage 58 having one end contiguous to the central passage 57 and the other end open to the outside in front of the first plunger flange portion 53. Further, there is also provided a plunger second communication passage 59 having one end open to the central passage 57 and the other end open to the outside of the first plunger small diameter portion 50. An annular groove 60 is formed in the first plunger body 48 between the pair of seal members 47. Further, there is also provided a plunger third communication passage 61 having one end open to the annular groove 60 and the other end open to a stepped portion between the second and third plunger small diameter portions 51 and 52.

The valve body 23 is provided with a vacuum passage 62 having one end open to the constant pressure chamber 4 and the other end open to the second stepped portion 36, a variable pressure chamber communication passage 63 having one end open to the variable pressure chamber 5 and the other end open to the fourth bore portion 33, and a pressure accumulating chamber communication passage 64 having one end open to the pressure accumulating chamber 9 and the other end open to the third bore portion 32. A stopper 65 is inserted into the pressure accumulating chamber communication passage 64 and the annular groove 60 of the first plunger 45.

A ring-shaped retainer 66 is fitted into the first bore portion 30 of the valve body 23. A first control valve mechanism 72 is arranged between the retainer 66 and the second stepped portion 36. The first control valve mechanism 72 has a first flexible and cylindrical control valve body 73. The first control valve body 73 has a base portion pinched between and held by a retainer small diameter portion formed at a tip end of the retainer 66 and the first stepped portion 35.

A tip end of the first control valve body 73 can be seated on the second stepped portion 36 and the first plunger flange portion 53 and also can be separated therefrom. A vacuum valve 75 is constituted by the first control valve body 73 and the second stepped portion 36, and a first atmosphere valve 76 is constituted by the first control valve body 73 and the first plunger flange portion 53. A rigid member 77 is mounted on the tip end of the first control valve body 73, and a spring 78 is disposed between the rigid member 77 and a stepped portion of the input shaft 39.

A second control valve mechanism (compressed air valve) 79 is provided on the second plunger 46 within the valve body 23. The second control valve mechanism 79 has a second control valve body 80. A base portion of the second control valve body 80 is held by the second plunger small diameter portion 51, and a valve flange 81 is formed on a tip end of the second control valve body to be protruded radially inwardly.

The tip end of the second control valve body 80 can be seated on the third stepped portion 37 and the second plunger flange portion 56 and also can be separated therefrom. A second atmosphere valve 82 is constituted by the second control valve body 80 and the third stepped portion 37, and a compressed air valve 83 is constituted by the second control valve body 80 and the second plunger flange portion 56.

A rigid member 84 is mounted on the tip end of the second control valve body 80, and a spring 85 is disposed between the rigid member 84 and the plunger, thereby biasing the tip end of the second control valve body 80 toward the output shaft 42.

In FIG. 8, the reference numeral 86 denotes a valve body returning spring disposed between the front wall of the housing 1 and the valve body 23; 87 denotes an input shaft returning spring disposed between the stepped portion of the input shaft 39 and the retainer 66; 88 denotes a filter; and 89 denotes a silencer.

In the above-mentioned conventional pneumatic booster, the difference in pressure between the constant pressure chamber 4 and the variable pressure chamber 5 is created by seating the pressure in the variable pressure chamber 5 to the atmospheric pressure, and the power piston 3 is advanced by the difference in pressure, thereby outputting the increased propelling force through the output shaft 42. Further, by setting the pressure in the variable pressure chamber 5 to the pressure of the compressed air, a further increased pressure difference can be obtained, thereby providing a braking action with high response.

Figure 1:
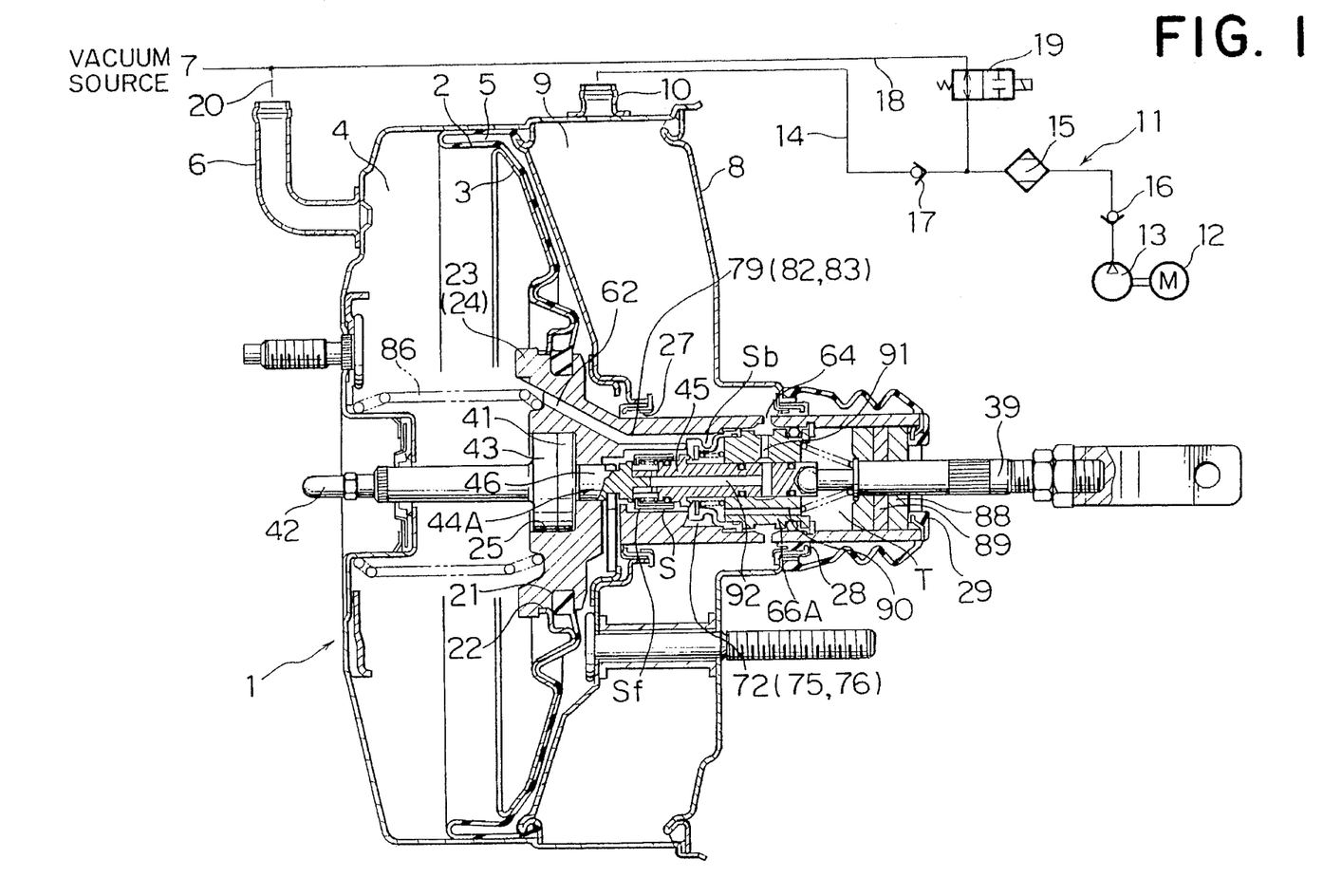
FIG. 1 is a sectional view of a pneumatic booster according to a preferred embodiment of the present invention.
Figure 2:
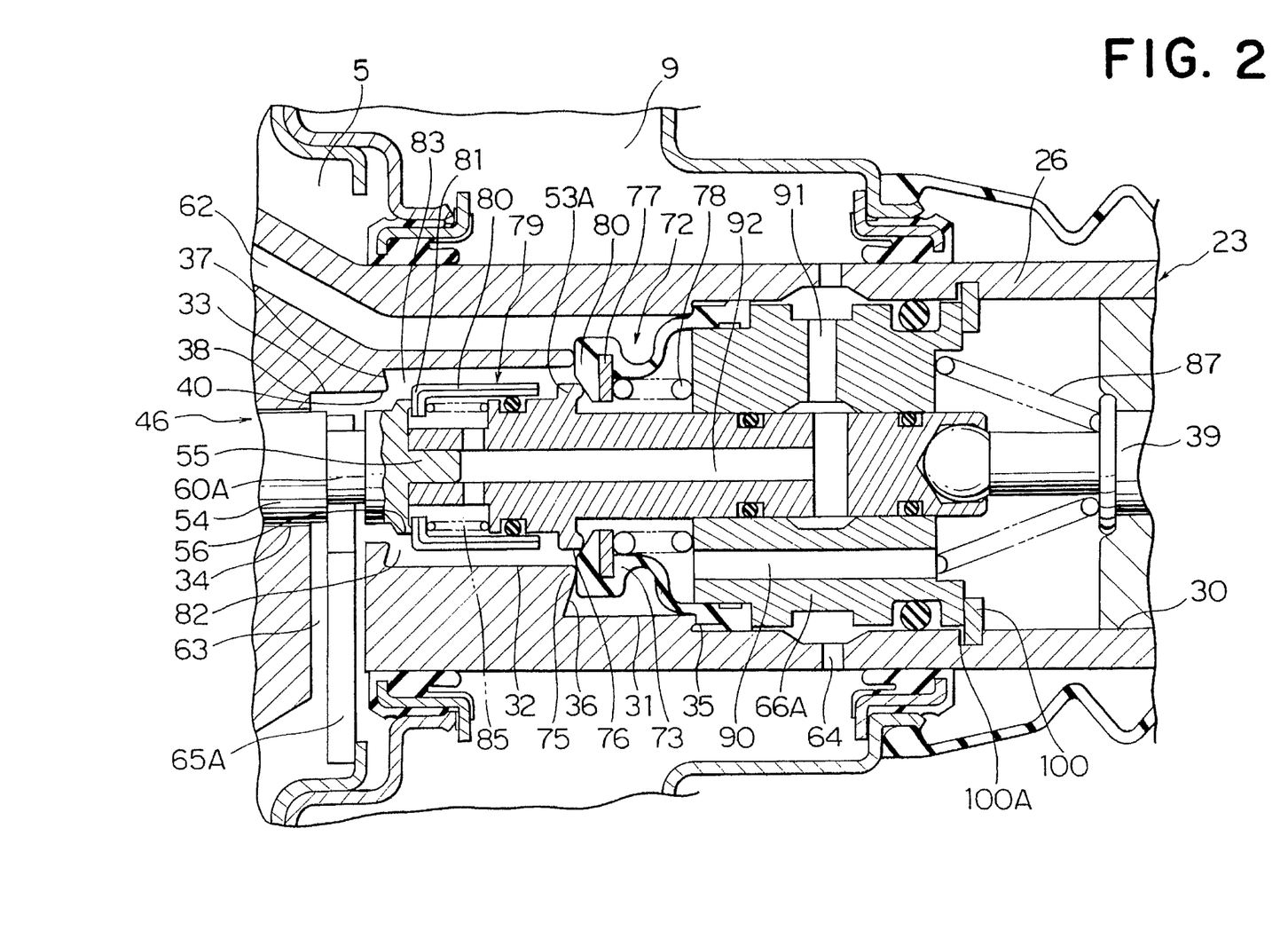
FIG. 2 is an enlarged sectional view showing a portion of FIG. 1.
Figure 4:
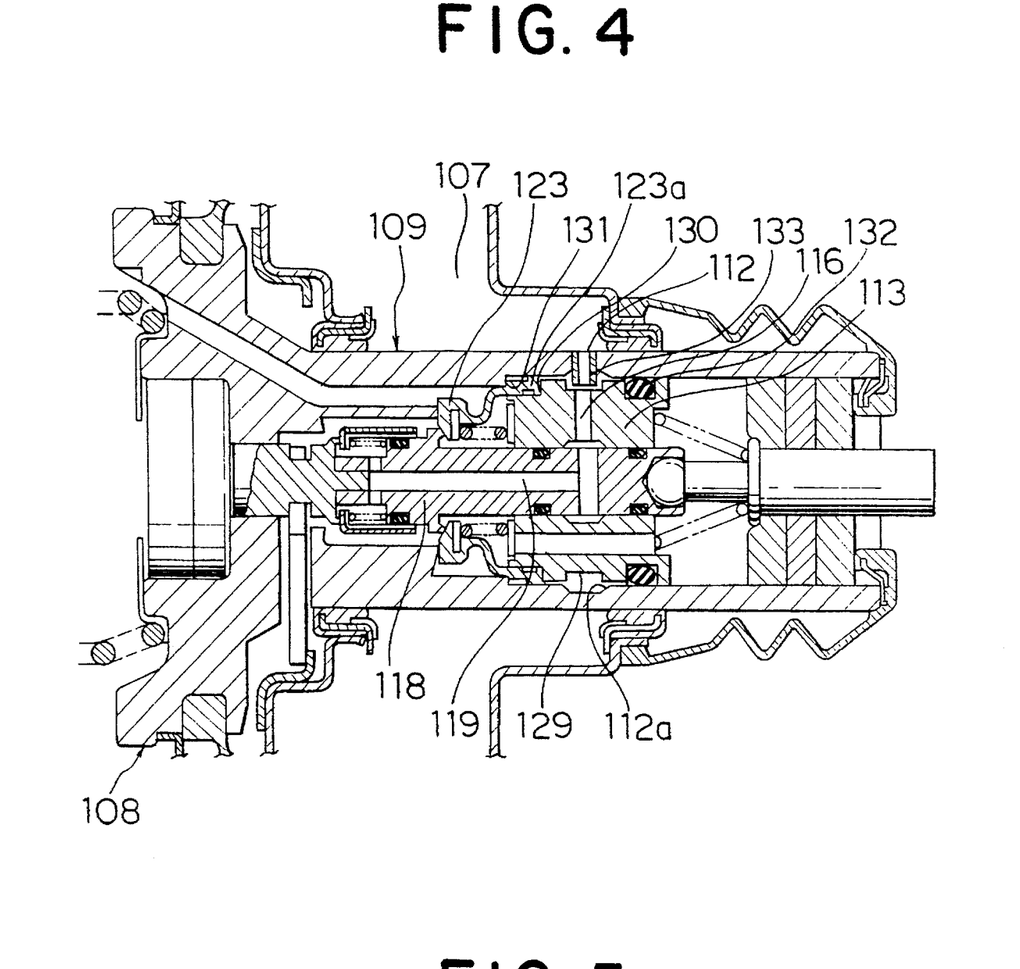
FIG. 4 is a sectional view of a pneumatic booster according to another embodiment of the invention.

Now, a pneumatic booster according to a preferred embodiment of the present invention will be explained with reference to FIGS. 1 and 2. Incidentally, the elements achieving the same functions as those shown in FIG. 4 are designated by the same reference numerals and explanation thereof will be omitted. In FIGS. 1 and 2, a substantially ring-shaped retainer 66A is sealingly inserted into the portion of a valve body 23 which provides a pressure accumulating chamber communication passage 64. A plunger 44A movable in response to the movement of an input shaft 39 and having a tip end protruding into a front space S (retainer front space) in front of the retainer 66A within the valve body 23 is sealingly inserted into the retainer 66A. The valve body 23 is provided with a vacuum passage 62 having one end open to a constant pressure chamber 4 and the other end open to a rear portion Sb of the retainer front space S. Further, the valve body 23 is also provided with a variable pressure chamber communication passage 63 having one end open to a variable pressure chamber 5 and the other end open to a front portion Sf of the retainer front space S.

The retainer 66A is provided with a retainer first passage 90 having one end open to the retainer front space S and the other end open to a retainer rear space T within the valve body 23. The retainer 66A is also provided with a retainer second passage 91 having one end open to the pressure accumulating chamber communication passage 64 and the other end open to an inner diameter portion of the retainer. An annular groove 60A is formed in a first plunger 45. The annular groove 60A is disposed in the place corresponding to the variable pressure chamber communication passage 63 so that a stopper 65A is inserted into the annular groove 60A and the variable pressure chamber communication passage 63.

The plunger 44A is provided with a plunger passage 92 having one end open to the retainer second passage 91 and the other end open to the front portion Sf of the retainer front space S. A first control valve mechanism 72 is disposed within the rear portion Sb of the retainer front space S. The first control valve mechanism 72 includes a vacuum valve portion 75 for permitting and preventing communication between the vacuum passage 62 and the front portion Sf of the retainer front space S, and a first atmosphere valve portion 76 for permitting and preventing communication between the retainer first passage 90 and the front portion Sf of the retainer front space S. A second control valve mechanism 79 is disposed within the front portion Sf of the retainer front space S. The second control valve mechanism 79 includes a compressed air valve portion 83 for permitting and preventing communication between the plunger passage 92 and the variable pressure chamber communication passage 63, and a second atmosphere valve portion 82 fox permitting and preventing communication between the rear portion Sb of the retainer front space S and the variable pressure chamber communication passage 63.

Next, an operation of the pneumatic booster having the above-mentioned arrangement will be explained.

During a normal braking operation for normal speed reduction, when the plunger 44A is advanced through the input shaft 39 by depressing the brake pedal, a first plunger flange portion 53A is separated from the first control valve body 73 of the first control valve mechanism 72, thereby opening the first atmosphere valve portion 76. Consequently, the atmosphere is introduced into the variable pressure chamber 5 through the first atmosphere valve portion 76, the second atmosphere valve portion 82 and the variable pressure chamber communication passage 63. As a result, the difference in pressure is created between the constant pressure chamber 4 and the variable pressure chamber 5. Thus, the power piston 3 is advanced by the difference in pressure to afford a great propelling force to the output shaft 42, thereby generating a braking force via the master cylinder (not shown) connected to the output shaft 42.

During a braking operation for high speed reduction or during an emergent braking operation, the input shaft 39 is further pushed to further advance the plunger 44A, thereby urging the valve flange 81 of the second control valve mechanism 79 against the third stepped portion 37 and opening the compressed air valve portion 83 by further advancing the plunger 44A in a condition that the valve flange 81 is supported by the third stepped portion 37. As a result, the compressed air stored in the pressure accumulating chamber 9 flows into the variable pressure chamber 5 through the pressure accumulating chamber communication passage 64, the retainer second passage 91 and the compressed air valve portion 83. Consequently, between the constant pressure chamber 4 and the variable pressure chamber 5, there arises the pressure difference greater than the aforementioned pressure difference created when the atmosphere was introduced into the variable pressure chamber 5. Thus, the power piston 3 is advanced by the greater pressure difference to afford a greater propelling force to the output shaft 42, thereby generating a greater braking force via the master cylinder (not shown) connected to the output shaft 42.

Following the above-mentioned condition, when the brake pedal is released, the input shaft 39 and the plunger 44A are retarded relative to the valve body 23 under the action of the elastic members, such as the input shaft returning spring 87 and reaction disk 41, with the result that the tip end of the first control valve body 73 of the first control valve mechanism is pushed by the first plunger flange portion 53A to be separated from the second stepped portion 36, thereby opening the vacuum valve 75. Consequently, the compressed air introduced into the variable pressure chamber 5 is discharged into the vacuum source 7 of the engine through the variable pressure chamber communication passage 63, vacuum valve portion 75 and vacuum passage 62.

As mentioned above, according to the present invention, since the plunger passage 92 alone is formed in the plunger 44A, a radial dimension of the plunger 44A can be reduced in comparison with that of the plunger 44 shown in FIG. 8, and, thus, a radial dimension of the entire booster can be reduced, thereby making the booster compact.

Since the first control valve mechanism 72 is disposed in front of the pressure accumulating chamber communication passage 64, even when the opening portion 29 of the valve body 23 is shortened in comparison with the conventional booster shown in FIG. 8, the installation space for the filter 88, silencer 89 and the like can be well reserved. Thus, an axial direction of the booster can be shortened accordingly, thereby making the booster more compact.

Figure 3:
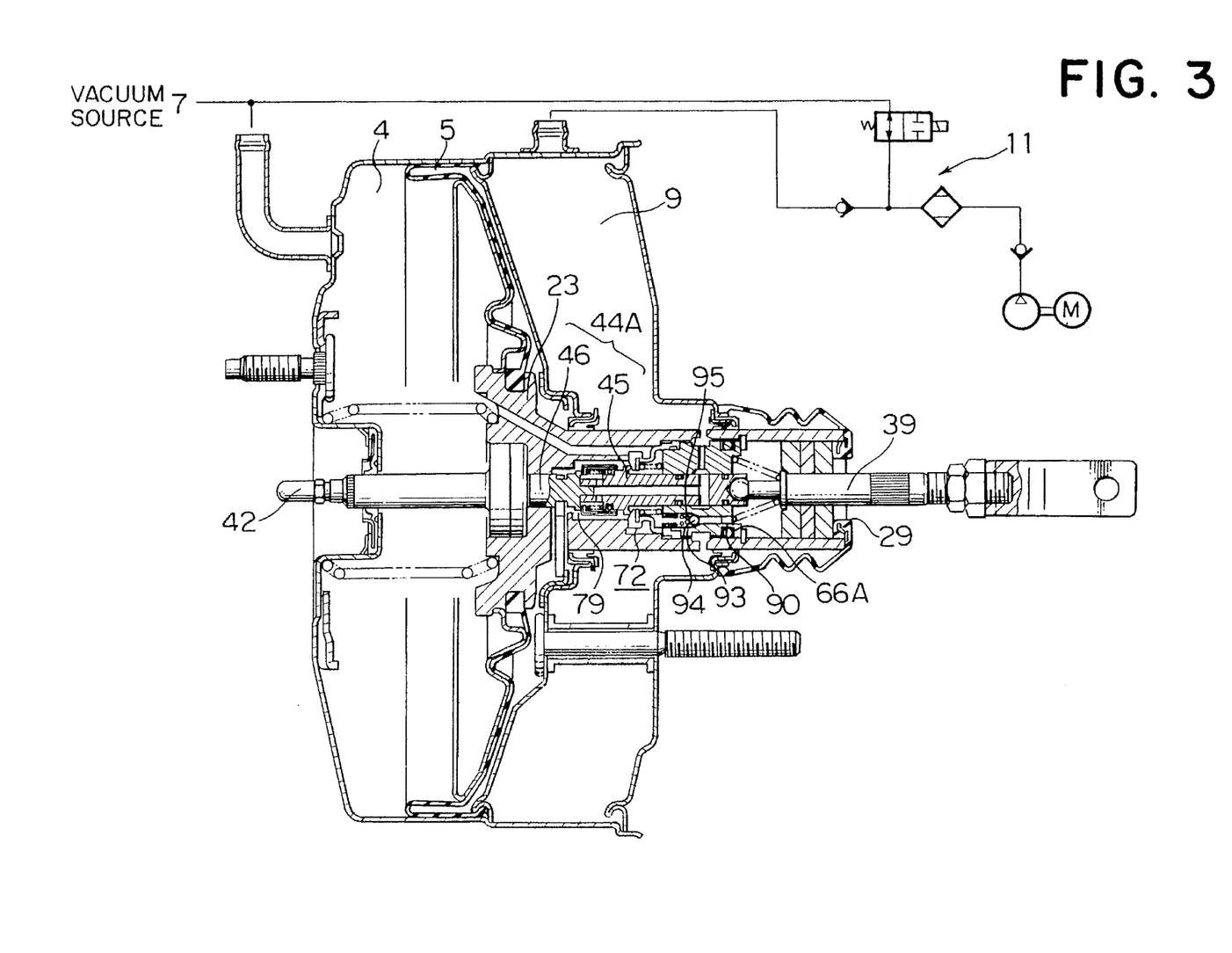
FIG. 3 is a sectional view showing an alteration of the booster of FIG. 1, which alteration has a check valve.

Unlike the pneumatic booster shown in FIGS. 1 and 2, in a pneumatic booster according to another embodiment of the present invention shown in FIG. 3, a check valve is provided in the retainer. That is to say, in FIG. 3, a portion of the retainer first passage 90 near the output shaft 42 has a large diameter bore 93 into which a valve body 94 is inserted. The valve body 94 serves to open and close the retainer first passage 90 to permit only the air flow from the retainer first passage 90 to the large diameter bore 93. The valve body 94 and the retainer first passage 90 constitute a check valve 95. By providing such a check valve 95, it is possible to prevent the compressed air stored in the variable pressure chamber 5 from being discharged through the opening portion 29, thereby preventing occurrence of noise. Incidentally, a check valve may be provided by arranging a ring-shaped disk made of rubber in the retainer 66A near the output shaft 42 to open and close the retainer first passage 90.

With reference particularly to FIG. 2, in the foregoing embodiments, the retainer is held in the cylindrical portion of the valve body by using a snap ring 100 fit in a groove 100A. Machining the groove 100A takes time and assembling the snap ring is not easy. Furthermore, the groove weakens the cylindrical portion of the valve body. Therefore, it is desired to eliminate the use of the snap ring from the viewpoint of the cost of the booster and the strength of the valve body.

The third embodiment shown in FIGS. 4 through 7 eliminates these problems. The third embodiment is the same as the first embodiment except for what will be described hereunder.

In the pneumatic booster shown in FIG. 4, a generally cylindrical retainer 113 is fit in a cylindrical portion 109 of a valve body 108. The inner wall of the cylindrical portion 109 is provided with a circumferential groove 112a. A communication passage 112 extends through the side wall of the cylindrical portion so that the inner end of the passage opens to the groove 112a and the outer end of the same communicates with a source of pressurized air through an accumulation chamber 107. The cross section of the communication passage 112 is rectangular. The outer surface of the retainer 113 is provided with a circumferential groove 129 in the place facing the communication passage 112. The retainer 113 is also provided with a passage 116 which opens in the outer groove 129 so as to communicate the communication passage 112 with a pressurized air passage 119 in a plunger 118. The retainer has a stepped portion 130 on the outer surface of one end portion thereof and the cylindrical portion 109 also has a stepped portion 131 on the inner surface thereof. These stepped portions clamp a base portion 123a of a valve member 123 to support the valve member. The base portion 123a also functions to seal the gap between the cylindrical portion 109 and the retainer 113. In order to seal the gap between the other end of the retainer 213 and the cylindrical portion 109, an O-ring 132 is provided.

Figure 5:
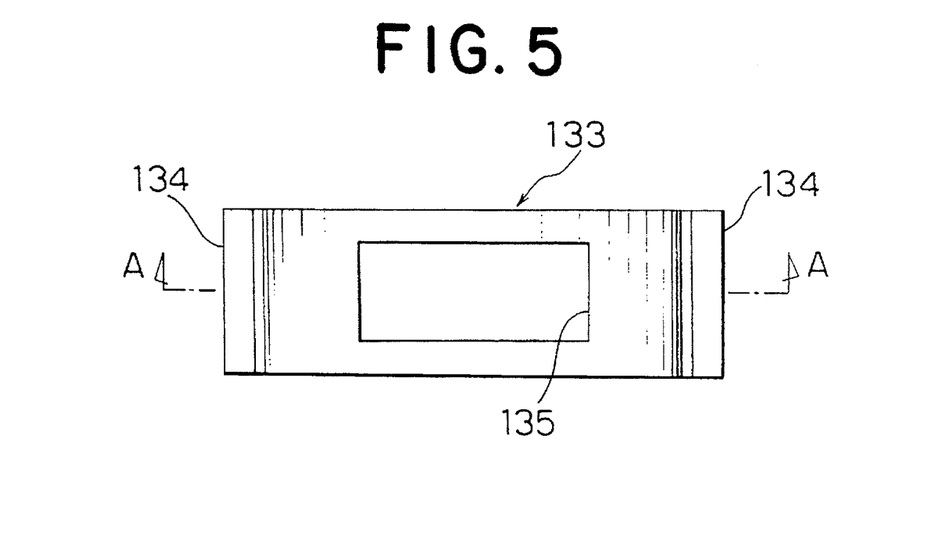
FIG. 5 is a plan view of a stopper used in the booster of FIG. 4.
Figure 6:
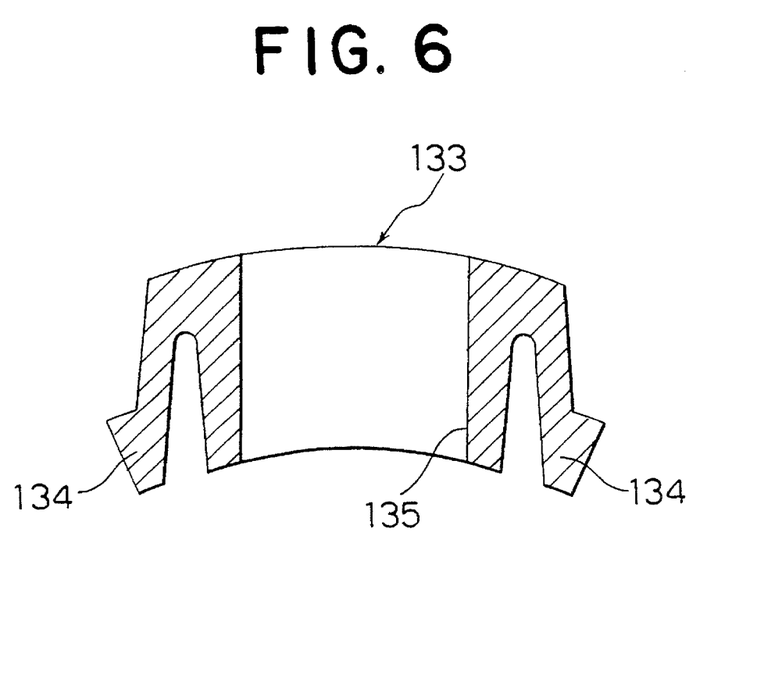
FIG. 6 is a sectional view of the stopper.
Figure 7:
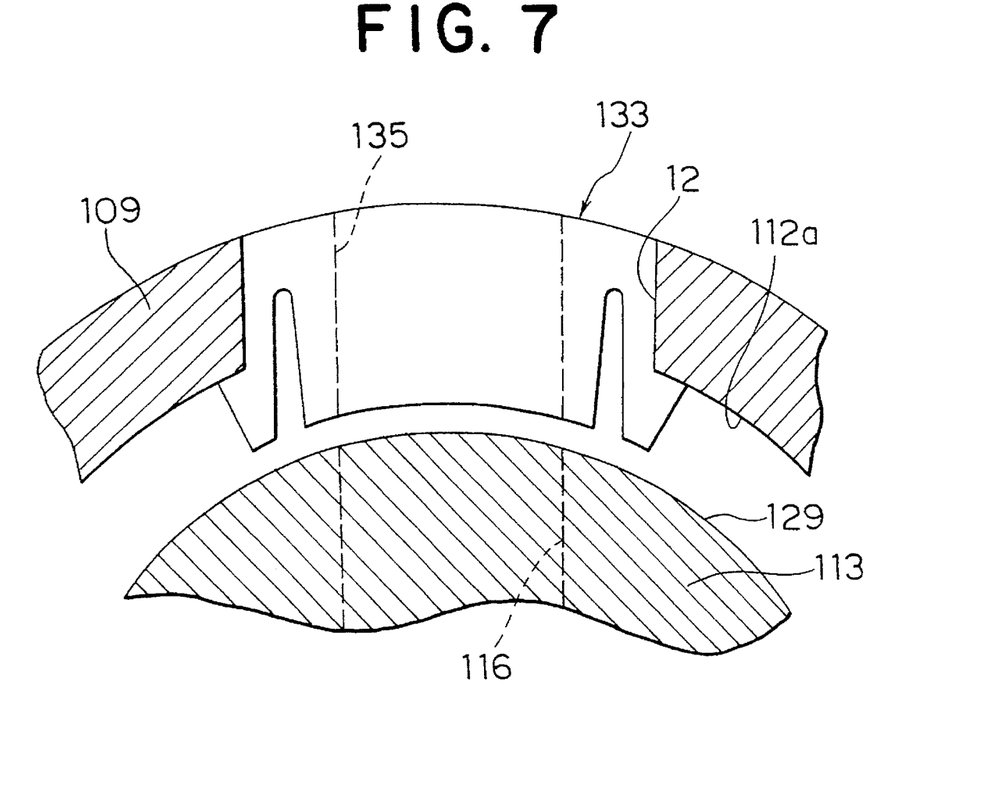
FIG. 7 is a sectional view of the stopper and the associated portion of the retainer.

A stopper 133 is fit in the communication passage 112 of the cylindrical portion 109. The inner end portion of the stopper 133 extends beyond the inner surface of the cylindrical portion 109 so that it engages the outer groove 129 of the retainer 113, thereby preventing the retainer from coming off the cylindrical portion 109. As shown in FIGS. 5 and 6, the stopper has a generally arcuate configuration which fills the arcuate space of the communication passage 112 formed in the side wall of the cylindrical portion 109 and having a rectangular cross section. The stopper has latch portions 134 on the opposite ends with respect to the longitudinal direction of the stopper so that the latch portions are outwardly spaced from the stopper body portion at the radially inner side of the stopper. When the stopper 133 is inserted in the communication passage 112 as shown in FIG. 7, the latch portions 134 engage the edge of the communication passage 112 with the radially inward portion of the stopper projecting from the inner surface of the cylindrical portion 109 so that the stopper is held in the communication passage 112. The radially inward portion of the stopper projecting from the inner surface of the cylindrical portion 109 engages the outer groove 129 of the retainer 113 so that the retainer is prevented from coming off from the cylindrical portion 109. The stopper 33 has a passage 135 which communicates the pressurized air accumulation chamber 107 and the retainer passage 116 when the stopper is fit in the communication passage 112. It is desirable that the stopper 133 is made of a resilient material such as plastics so as to facilitate deformation of the latch portions 134.

In operation, the stopper 133 is assembled after the retainer 113 is inserted in the cylindrical portion 109 of the valve body 108 by fitting the stopper 133 in the communication passage 112 from the outside of the cylindrical portion 109 with the latch portions 134 deformed to allow insertion of the stopper. When the stopper is driven to a predetermined extent, the latch portions open to engage the edge of the communication passage 112 to fix the stopper at that position. In this condition, the radially inward portion of the stopper 133 projects from the inner surface of the cylindrical portion 109 and engages the outer groove 129 of the retainer 113 so as to prevent the retainer from being removed from the cylindrical portion.

Thus, the stopper 133 is useful for fixing the retainer 113 by merely inserting it in the communication passage 112 from the outside of the cylindrical portion 109. Therefore, no special tool is required for mounting the retainer. Since the cylindrical portion 109 does not need any groove for receiving a snap ring, the valve body 108 is prevented from being weakened. Furthermore, since the communication passage 112 is used to accommodate the stopper 133 and the communication between the pressurized accumulation chamber 107 and the retainer passage 116 is established through the passage in the stopper 133, it is not necessary to make an additional through hole in the side wall of the cylindrical portion 109 for the particular purpose of accommodating the stopper.

While the passage 135 is formed in the stopper 133, communication through the stopper may be achieved in other ways. For example, a side wall of the stopper may have a recess which define a space between itself and a side wall portion of the communication passage so that the space extends to establish communication between the pressurized air accumulation chamber 107 and the retainer passage 116.

What is claimed is:

1. A pneumatic booster for a brake system comprising:
   a housing;
   a movable power piston provided in the housing and dividing the interior of the housing into a constant pressure chamber and a variable pressure chamber;

a valve body connected to said power piston and having a cylindrical portion extending to the outside of the housing, said cylindrical portion having a bore axially extending therein;

a source of pressurized air;

a communication passage formed in the side wall of said cylindrical portion, the outer end of said communication passage being connected to said source of pressurized air;

a retainer inserted in said bore of the cylindrical portion so as to divide the interior of said bore into a front space and a rear space and having a retainer passage which communicates with said communication passage, said rear space being communicated with the atmosphere;

a plunger slidably and sealingly supported by said retainer and having a pressurized air passage communicating said retainer passage and said front space;

a constant pressure chamber passage in said valve body for communicating said constant pressure chamber with said front space;

a variable pressure chamber passage in said valve body for communicating said variable pressure chamber with said front space;

an atmospheric pressure passage axially extending through said retainer and connecting said front and rear spaces; and control valve means for selectively changing communication between said constant pressure chamber, variable pressure chamber, pressurized air passage and atmospheric pressure passage so that said variable pressure chamber is selectively supplied with the atmospheric pressure and pressurized air in response to the movement of said plunger.

2. A pneumatic booster according to claim 1, wherein said constant pressure chamber passage opens to a rear portion of said front space and said variable pressure chamber passage opens to a front portion of said front space and, wherein, said control valve means comprises:

a first valve mechanism placed in a rear portion of said front space and having a constant pressure valve portion for controlling communication between said constant pressure chamber passage and the front portion of said front space and a first atmospheric pressure valve portion for controlling communication between said atmospheric pressure passage and said front portion of said front space; and a second valve mechanism placed in the front portion of said front space and having a pressurized air valve portion for controlling communication between said pressurized air passage in the plunger and said variable pressure chamber passage and a second atmospheric pressure valve portion for controlling communication between the rear portion of said front space and said variable pressure chamber passage.

3. A pneumatic booster according to claim 1, wherein said constant pressure chamber is a vacuum chamber connected to an engine.

4. A pneumatic booster for a brake system comprising:

a housing;

a movable power piston provided in the housing and dividing the interior of the housing into a constant pressure chamber and a variable pressure chamber;

a valve body connected to said power piston and having a cylindrical portion extending to the outside of the housing, said cylindrical portion having a bore axially extending therein;

a source of pressurized air;

a communication passage formed in the side wall of said cylindrical portion, the outer end of said communication passage being connected to said source of pressurized air;

a retainer inserted in said bore of the cylindrical portion so as to divide the interior of said bore into a front space and a rear space and having a retainer passage which communicates with said communication passage, said rear space being communicated with the atmosphere;

a plunger slidably and sealingly supported by said retainer and having a pressurized air passage communicating said retainer passage and said front space;

a constant pressure chamber passage for communicating said constant pressure chamber with said front space;

a variable pressure chamber passage for communicating said variable pressure chamber with said front space;

an atmospheric pressure passage for connecting said front space to the atmosphere;

control valve means for selectively changing communication between said constant pressure chamber, variable pressure chamber, pressurized air passage and atmospheric pressure passage so that said variable pressure chamber is selectively supplied with the atmospheric pressure and pressurized air in response to the movement of said plunger; and a stopper inserted in said communication passage in the cylindrical portion and having a stopper passage communicating said source of pressurized air with said retainer passage and a portion engageable with said retainer for preventing the retainer from being removed from the cylindrical portion.

5. A pneumatic booster according to claim 4, wherein said retainer has an outer circumferential groove and said stopper engages the groove of the retainer.

6. A pneumatic booster according to claim 4, wherein said stopper has latch portions which engage the edge of said communication passage of the cylindrical portion.

* * * * *